United States Patent

Wittmann et al.

[11] Patent Number: 4,961,854
[45] Date of Patent: Oct. 9, 1990

[54] ACTIVATED SLUDGE WASTEWATER TREATMENT PROCESS

[75] Inventors: John W. Wittmann, New Berlin; Donald J. Thiel, Waukesha; George W. Smith, Mukwonago, all of Wis.

[73] Assignee: Envirex Inc., Waukesha, Wis.

[21] Appl. No.: 213,321

[22] Filed: Jun. 30, 1988

[51] Int. Cl.$^5$ .............................................. C02F 3/20
[52] U.S. Cl. .................... 210/621; 210/626; 210/903; 210/906; 210/220; 261/122
[58] Field of Search ............... 210/605, 614, 621, 626, 210/629, 903, 906, 242.2, 220; 261/122

[56] References Cited

U.S. PATENT DOCUMENTS

| | | | |
|---|---|---|---|
| 3,764,523 | 10/1973 | Stankewich, Jr. | 210/604 |
| 3,939,068 | 2/1976 | Wendt et al. | 210/605 |
| 3,953,327 | 4/1976 | Parker | 210/605 |
| 3,964,998 | 6/1976 | Barnard | 210/605 |
| 3,994,802 | 11/1976 | Casey et al. | 210/605 |
| 4,011,156 | 3/1977 | Dubach et al. | 210/903 |
| 4,056,465 | 11/1977 | Spector | 210/605 |
| 4,162,153 | 7/1979 | Spector | 210/903 |
| 4,269,714 | 5/1981 | Ishikawa et al. | 210/629 |
| 4,479,876 | 10/1984 | Fuchs | 210/903 |
| 4,563,277 | 1/1986 | Tharp | 210/220 |
| 4,631,134 | 12/1986 | Schüssler | 210/242.2 |

FOREIGN PATENT DOCUMENTS

| | | |
|---|---|---|
| 597951 | 5/1960 | Canada . |
| 3600232 | 7/1987 | Fed. Rep. of Germany . |
| 233814 | 3/1986 | German Democratic Rep. . |
| 53-29551 | 8/1978 | Japan . |
| 59-52591 | 3/1984 | Japan . |

OTHER PUBLICATIONS

Process design Manual for Upgrading Existing Wastewater Treatment Plants, pp. 5-11 to 5-13, USEPA, 10/74.

Primary Examiner—Peter Hruskoci
Assistant Examiner—Christopher Upton
Attorney, Agent, or Firm—Michael, Best & Friedrich

[57] ABSTRACT

Wastewater and recycled activated sludge are homogeneously mixed in a first aeration zone by injecting an oxygen-containing gas such as air into the lower portion of the zone under conditions which produce a complete mix reaction and sufficient oxygen is supplied to meet the biological oxygen demands of the mixed liquor. The gas is introduced, preferably by a plurality of fine bubble membrane diffusers, in the form of fine bubbles having a diameter less than about 4 mm. The bubbles provide both the mixing to keep solids in suspension and the oxygen required to maintain the overall dissolved oxygen content in the first aeration zone as close to 0 as possible. The mixed liquor is sequentially contacted with an oxygen-containing gas in second and third aeration zones under conditions which produce a complete mix reaction, preferably by fine bubble membrane diffusers, clarified and a portion of the settled sludge is recycled to the first aeration zone.

14 Claims, 1 Drawing Sheet

ACTIVATED SLUDGE WASTEWATER TREATMENT PROCESS

BACKGROUND OF THE INVENTION

This invention relates to treatment of BOD-containing wastewaters, such as municipal sewage, industrial wastewaters and the like, by an activated sludge process and, more particularly, to such a process wherein a wastewater influent and recycled activated sludge are first mixed in an aeration zone into which an oxygen-containing gas is introduced.

Activated sludge processes have been used for some time to remove biological oxygen demand (BOD) from municipal sewage, industrial wastewaters and the like. In such a process, a wastewater influent is mixed with a microorganism-containing recycled biomass or activated sludge in an initial contact zone to form a mixed liquor. At some point in the process the mixed liquor is aerated with sufficient oxygen to grow and maintain a satisfactory population of microorganisms which sorb, assimilate and metabolize the BOD of the wastewater.

In the activated sludge process disclosed in U.S. Pat. No. 4,056,465, the wastewater and recycled activated sludge are mixed with mechanical stirring means in an initial contact zone from which air is excluded in order to operate under anaerobic conditions. The mixed liquor is subsequently treated in one or more aeration or aerobic zones before being clarified to separate an activated sludge.

In the so-called Bardenpho activated sludge process disclosed in U.S. Pat. No. 3,964,998, wastewater and recycled activated sludge are mixed with mechanical stirring means in a first stage which is operated under anoxic conditions. The mixed liquor is subsequently aerated in a second stage, subjected to anoxic conditions in a third stage, aerated in a fourth stage and then clarified to separate an activated sludge.

In a so-called orbal process, wastewater and recycled reactivated sludge are mixed and circulated around a plurality of concentric, annular basins or channels by a plurality of surface aeration discs which churn oxygen into the upper surface of the mixed liquor and provide sufficient agitation to prevent settling. The mixed liquor flows from one channel to the next and finally is introduced into a clarifier to separate an activated sludge. The channels can be operated as a series of complete mix reactors so that the dissolved oxygen content in the first channel in which the wastewater and recycled activated sludge is initially mixed is about 0 and the dissolved oxygen content is subsequently increased as the mixed liquor moves from one channel to the next.

The mechanical stirring and aeration devices required by these processes involve considerable equipment and operating costs. Also, in some systems it is difficult to control the dissolved oxygen content within a desired range when many of these aerating devices are used as a means for introducing oxygen into the first aeration zone.

Other activated sludge wastewater treatment processes are disclosed in U.S. Pat. Nos. 3,764,523, 3,939,068, 3,953,327 and 3,994,802.

Applicants are unaware of any prior activated sludge wastewater treatment processes wherein wastewater and recycled activated sludge are initially mixed in an aeration zone which is operated as a complete mix reactor and at a low dissolved oxygen content and the source for the oxygen-containing gas also serves as the sole, or at least the primary, source of agitation for the mixed liquor.

SUMMARY OF THE INVENTION

An object of the invention is to provide an activated sludge wastewater treatment process requiring less energy to operate.

Another object of the invention is to provide an activated sludge wastewater treatment process in which the means for introducing an oxygen-containing gas into an initial aeration zone operating as a complete mix reactor and at a low dissolved oxygen content also serves as the sole, or at least the primary, source of agitation for the mixed liquor.

A further object of the invention is to provide such an activated sludge wastewater treatment process in which the introduction of oxygen into the mixed liquor can be conveniently controlled to obtain an optimum range of dissolved oxygen content.

A still further object of the invention is to provide such an activated sludge wastewater treatment process in which the oxygen-containing gas is introduced into the initial aeration zone in the form of fine bubbles.

Other objects, aspects and advantages of the invention will become apparent to those skilled in the art upon reviewing the following detailed description, the drawing and the appended claims.

The invention provides an activated sludge wastewater treatment process in which a BOD-containing wastewater influent and recycled activated sludge are introduced into a first aeration zone and homogeneously mixed therein primarily by injecting an oxygen-containing gas under conditions which produce a complete mix reaction and sufficient oxygen is provided by the oxygen-containing gas to meet, but not substantially exceed, the biological oxygen demand of the resulting mixed liquor. The overall dissolved oxygen content in the first aeration zone preferably does not exceed about 0.5 mg/l. The oxygen-containing gas is introduced into the lower portion of the first aeration zone in the form of fine bubbles which have a diameter of less than about 4 mm and are substantially uniformly dispersed throughout the first aeration zone. The mixed liquor is transferred from the first aeration zone to a subsequent aeration zone wherein the mixed liquor is contacted with an oxygen-containing gas under conditions which produce a complete mix reaction in the subsequent reaction zone and sufficient oxygen is provided to produce an overall dissolved oxygen content of at least 0.5 mg/l. The oxidized mixed liquor from the subsequent aeration zone is transferred to a settling zone wherein a supernatant liquid is separated from settled sludge and at least a portion of the settled sludge is recycled to the first aeration zone as activated sludge.

In one embodiment, the subsequent aeration zone includes second and third aeration zones in series and in which the mixed liquor is contacted with an oxygen-containing gas under conditions which produce a complete mix reaction in each zone and sufficient oxygen is provided to produce an overall dissolved content within the range of about 0.5 to about 1.5 mg/l in the second aeration zone and of at least 2.0 mg/l in the third aeration zone.

The oxygen-containing gas preferably is air and preferably is introduced into the first aeration zone with one or more fine bubble aerating devices including a flexible membrane having perforations through which the oxygen-containing gas is injected into the contents of the first aeration zone. Fine bubble membrane aerating devices preferably are also used to introduce the oxygen-containing gas into the second and third aeration zones.

In one embodiment, a portion of the mixed liquor from the second aeration zone, the third aeration zone or both the second and third aeration zones is recycled to the first aeration zone to increase the removal of nitrogen values from the wastewater.

In one embodiment, to enhance release of soluble phosphates, the wastewater influent and recycled activated sludge is introduced into a restricted oxygen zone, instead of the first aeration zone, and is mixed in the restricted oxygen zone by introducing an oxygen-containing gas into the lower portion of the zone under conditions which produce sufficient agitation to effect substantially homogeneous mixing of the wastewater and the recycled activated sludge and minimize settling of solids. The mixed liquor is transferred from the restricted oxygen zone and otherwise treated in the same manner as summarized above to reduce BOD.

DESCRIPTION OF THE PREFERRED EMBODIMENTS

Figure 1:
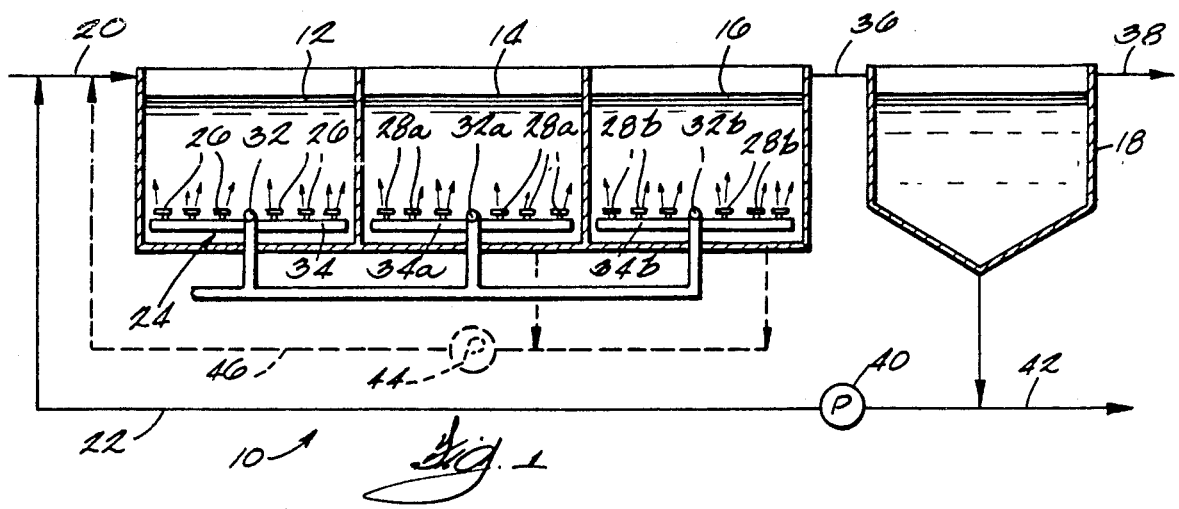
FIG. 1 is a schematic and diagrammatic representation of an activated sludge wastewater treatment system for practicing the process of the invention.
Figure 2:
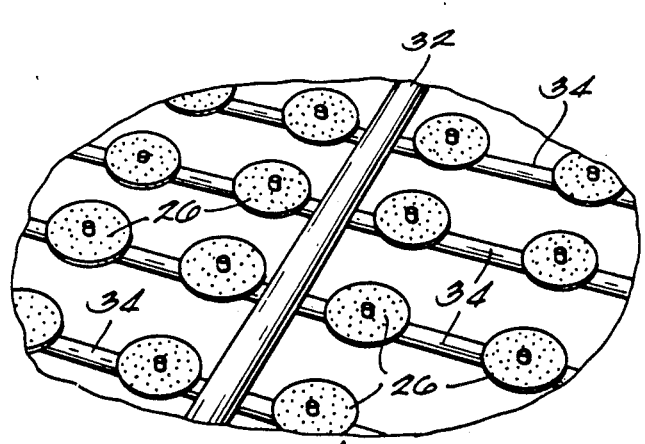
FIG. 2 is a fragmentary, top plan view of the bottom portion of the first aeration zone including fine bubble membrane diffusers.
Figure 3:
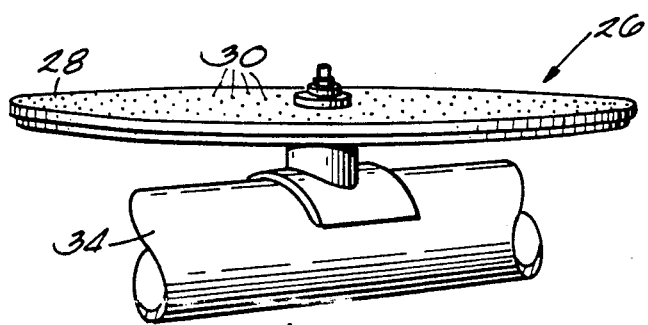
FIG. 3 is an enlarged fragmentary view of a diffuser of FIG. 2.

FIG. 1 illustrates a system 10 for practicing the activated sludge treatment process of the invention including a first aeration zone or tank 12, a second aeration zone or tank 14, a third aeration zone 16 and a settling tank or clarifier 18. A wastewater influent, which usually is subjected to screening and/or a preliminary sedimentation treatment (not shown) to remove large particulate materials, is introduced into the first aeration tank via a supply conduit 20 along with activated sludge recycled from the clarifier via a conduit 22. The wastewater and recycled activated sludge are homogeneously mixed in the first aeration tank to form a mixed liquor, solely or at least primarily, by an oxygen-containing gas introduced into the lower portion of the first aeration tank via an aeration device 24 which produces fine bubbles having a diameter less than about 4 mm, preferably about 1 to about 3 mm.

The oxygen-containing gas is introduced under conditions which produce a complete mix reaction in the first aeration tank 12 and sufficient oxygen is provided by the oxygen-containing gas to meet, but not substantially exceed, the biological oxygen demand of the mixed liquor. The dissolved oxygen content preferably is maintained at as close to 0 as possible; however, because of changing conditions, it may periodically fluctuate above 0. The overall dissolved oxygen content in the first aeration tank 12 should not exceed about 0.5 mg/l.

The oxygen-containing gas preferably is air supplied through a plurality of conventional fine bubble (fine pore) membrane diffusers 26 having an expandable flexible membrane 28 including a plurality of perforations 30 through which air is injected into the contents of the first aeration tank 12.

The diffusers 26 are uniformly distributed in the lower portion of the first aeration tank, either near the bottom or along one side. The diffusers 26 can be either a pipe type or a disc type like that disclosed in U.S. Pat. No. 4,631,134 which is incorporated herein by reference. Such a disc type diffuser includes a membrane or diaphragm made from an expandable, elastomeric material, such as a synthetic rubber, and includes perforations having openings which provide the desired bubble size when the diaphragm is deflected or expanded upon the introduction of pressurized air into the diffuser; and The relatively large surface area to volume ratio of fine bubbles having a diameter of 4 mm or less results in a more efficient transfer of oxygen into the mixed liquor than possible with other aeration means. A fine bubble membrane diffuser is particularly advantageous because the membrane can be periodically flexed or expanded to dislodge materials produced in the low dissolved oxygen environment in the first aeration tank 12 which might plug the perforations 30, a shortcoming of fine bubble ceramic diffusers and plate aerators. Fine bubble membrane diffusers can be intermittently operated, if desired, to control the amount of oxygen-containing gas introduced and thereby permit the dissolved oxygen content to be maintained within an optimum range.

As the fine air bubbles rise from the diffusers 26 through the first aeration tank 12, they produce a turbulent mixing action which homogeneously mixes the wastewater and recycled activated sludge together and prevents the resulting mixed liquor from settling. Air flow to the diffusers 26 is controlled to produce the dissolved oxygen content discussed above. Thus, the diffusers 26 serve the dual function of providing the oxygen required to meet the biological oxygen demand of the mixed liquor and providing the necessary mixing action for the mixed liquor In most applications, there is no need to use supplemental mechanical mixing means with a resulting savings in equipment and energy costs. For instance, the amount of oxygen required for "weaker" wastewaters having lower biological oxygen demands to maintain the dissolved oxygen content at least less than 0.5 mg/l may be so low that the volume of air introduced by the diffuser is not sufficient to produce adequate mixing. In such a case, it may be necessary to provide some additional mixing with mechanical mixing means.

In the specific embodiment illustrated, a plurality of disc-type fine bubble membrane diffusers 26 are mounted in a grid-like array in the bottom of the first aeration tank 12 Air is supplied under pressure through a manifold 32 connected to a plurality of air supply conduits 34 which are arranged in parallel rows. A plurality of longitudinally spaced diffusers 26 are mounted on each supply conduit 34, preferably in an array so that the diffusers on adjacent air supply conduits form rows transverse to the air supply conduits.

The mixed liquor flows by gravity from the first aeration tank 12 to the second aeration tank 14 and from the second aeration tank 14 to the third aeration tank 16. In the second aeration tank 14 the mixed liquor is contacted with an oxygen-containing gas under conditions which produce a complete mix reaction and sufficient oxygen is provided to produce an overall dissolved oxygen content of at least 0.5 mg/l. The overall dissolved oxygen-content in the second aeration tank 14 preferably is maintained as close to 1.0 mg/l as possible.

In the third aeration tank 16 the mixed liquor is contacted with an oxygen-containing gas which produces a complete mix reaction and sufficient oxygen is provided to produce an overall dissolved oxygen content of at least 2.0 mg/l.

Various suitable means can be used to introduce an oxygen-containing gas into the second and third aeration tanks 14 and 16 and to agitate the contents in each tank to prevent settling Conventional fine bubble membrane diffusers 28a and 28b like those used in the first aeration tank 12 which produce fine bubbles having a diameter less than about 4 mm are preferred because they can serve the dual function of aeration and agitating. Also, they can be operated intermittently to obtain the dissolved oxygen content within an optimum range.

The mixed liquor is transferred from the third aeration tank 16 through a conduit 36 into the clarifier 18. The sludge settles in the clarifier 18 and a clarified effluent or supernatant is withdrawn from the upper portion of the clarifier via a conduit 38 for further treatment prior to disposal or reuse. A portion of the settled sludge withdrawn from the bottom portion of the clarifier 18 is recycled by a pump 40 through the conduit 22 back to the first aeration tank 12 as illustrated by solid lines in FIG. 1. Another portion of the settled sludge is removed via a conduit 42. The amount of activated sludge recycled to the first aeration tank 12 usually is about 15 to about 150, preferably about 50 to about 100%, of the wastewater influent introduced through the conduit 20.

Generally, approximately 35-70% of the total oxygen needed by the process is introduced into the first aeration tank, 20-40% into second aeration tanks and 10-25% into the third aeration tank.

With such a process up to about 80% of the nitrogen values can be removed from a wide variety of wastewaters. When removal of a higher amount of nitrogen is desired, a portion of the mixed liquor from the third aeration tank 16 and/or the second aeration tank 14 is recycled by a pump 44 through a conduit 46 as illustrated by dashed lines in FIG. 1. The amount of mixed liquor recycled to the first aeration tank 12 usually is about 100 to about 400% of the wastewater influent being introduced through the conduit 20.

The first, second and third aeration tanks 12, 14 and 16 can be a single tank or basin divided into three separate zones by partitions or walls as illustrated in FIG. 1 or can be completely separate tanks or basins connected by suitable conduit means. When these zones are rectangular, the length and width ratio in each zone generally should not exceed about 2:1.

Figure 4:
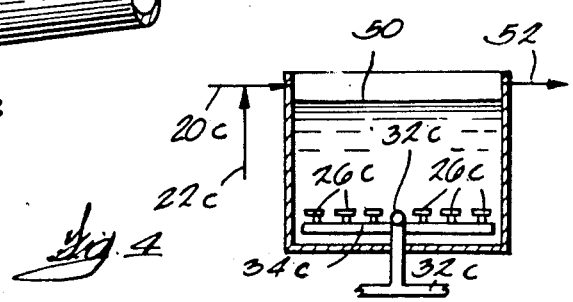
FIG. 4 is a fragmentary schematic and diagrammatic view of an alternate arrangement of the system.

The modified system illustrated in FIG. 4 provides improved phosphorous removal FIG. 4 shows only an additional restricted oxygen zone and, except as described below, the remainder of the system is substantially the same as that illustrated in FIG. 1.

Referring to FIG. 4, the wastewater influent and recycled activated sludge is introduced into a restricted oxygen zone or tank 50 instead of the first aeration tank. More specifically, a wastewater influent containing biological phosphorous requiring removal is introduced into the restricted oxygen tank 50 via a supply conduit 20c along with activated sludge recycled from the clarifier via a conduit 22c. The wastewater and recycled activated sludge is mixed in the restricted oxygen tank 50 by an oxygen-containing gas, such as air, introduced into the lower portion of the restricted oxygen tank 50 by a plurality of submerged gas diffusers. The oxygen-containing gas is introduced under conditions which produce sufficient agitation to effect substantially homogeneous mixing of the wastewater and recycled activated sludge and prevent or at least minimize settling of solids from the resulting mixed liquor.

This preliminary mixing of the wastewater and recycled activated sludge in the restricted oxygen tank 50 with an oxygen-containing gas enhances the release of soluble phosphates to the mixed liquor and a resulting enhanced uptake of phosphates by the biomass in the subsequent aeration zones. The mixed liquor flows by gravity from the restricted oxygen tank 50 via a conduit 52 into the first aeration tank and is subsequently treated in a series of complete mix reactors as described above. If a mixed liquor is recycled from one or more of the aeration tanks to improve nitrogen removal, it is recycled to the first aeration tank, not to the restricted oxygen tank 50 in order to maintain a low nitrate concentration in the restricted oxygen tank 50. The restricted oxygen tank 50 is relatively small and usually comprises less than 10% of the total volume of reaction tanks.

Various conventional diffuser-type devices can be used for the mixing in the restricted oxygen tank 50, including coarse bubble diffusers which produce bubbles of 10-20 mm diameter, fine bubble diffusers which produce bubbles of 1-4 mm diameter and medium bubble diffusers which produce bubbles of an intermediate diameter. In the specific construction illustrated, mixing is provided by a plurality of disc-type fine bubble diffusers 26c, like those described above, mounted in a grid-like array in the bottom of the restricted oxygen tank 50. Air is supplied under pressure through a manifold 32c connected to a plurality of air supply conduits 34c arranged in parallel rows The manifold 32b can be separate from or connected to the manifold 32 in FIG. 1.

From the foregoing description, one skilled in the art can easily ascertain the essential characteristics of the invention and, without departing from the spirit and scope thereof, make various changes and modifications to adapt it to various usages.

We claim:

1. In a process for treating BOD-containing wastewater by contacting a wastewater influent with activated sludge in a reaction zone to form a mixed liquor, separating a sludge from the mixed liquor and recycling the separated sludge to the reaction zone as activated sludge, the improvement comprising introducing the wastewater and recycled activated sludge into a first aeration zone and homogeneously mixing the wastewater and recycled activated sludge therein primarily by injecting an oxygen-containing gas under conditions which produce a complete mix reaction in said first aeration zone and sufficient oxygen is provided by said oxygen-containing gas to meet, but not substantially exceed, the biological oxygen demand of the resulting mixed liquor such that the overall dissolved oxygen content thereof is substantially 0 and does not exceed about 0.5 mg/l, said oxygen-containing gas being introduced into the lower portion of said first aeration zone by a a plurality of fine bubble diffusers located in the bottom of said first reaction zone and having a flexible member made from an expandable, elastomeric material and including perforations having openings for producing bubbles which have a diameter of about 1 to about 4 mm, when said oxygen-containing gas is introduced under pressure into said diffusers, and are substantially uniformly dispersed throughout said first aeration zone;

transferring the mixed liquor from said first aeration zone to a subsequent aeration zone wherein the mixed liquor is contacted with an oxygen-containing gas under conditions which produce a complete mix reaction in said subsequent aeration zone and sufficient oxygen is provided to produce an overall dissolved oxygen content of at least 0.5 mg/l;

transferring the oxidized mixed liquor from said subsequent aeration zone to a settling zone wherein a supernatant liquid is separated from settled sludge; and recycling at least a portion of the settled sludge to said first aeration zone as recycled activated sludge.

2. A process according to claim 1 wherein said subsequent aeration zone comprises a second aeration zone wherein the mixed or from said first aeration zone is contacted with an oxygen-containing gas under conditions which produce a complete mix reaction in said second aeration zone and sufficient oxygen is provided to produce an overall dissolved oxygen content within the range of about 0.5 to about 1.5 mg/l in said second aeration zone; and a third aeration zone wherein the mixed liquor from said second aeration zone is contacted with an oxygen-containing gas under conditions which produce a complete mix reaction in said third aeration zone and sufficient oxygen is provided to produce an overall dissolved oxygen content of at least 2.0 mg/l in said third aeration zone.

3. A process according to claim 2 wherein said oxygen-containing gas is introduced into said second and third aeration zones with one or more fine bubble aerating devices which produce gas bubbles less than about 4 mm and include a flexible membrane having perforations through which the oxygen-containing gas is injected into the contents of said second and third aeration zones.

4. A process according to claim 3 wherein said oxygen-containing gas is air.

5. A process according to claim 2 including and including a step of recycling a portion of the mixed liquor from said second aeration zone, said third aeration zone or both said second and third aeration zones to said first aeration zone for mixing therein with the wastewater and the recycled activated sludge.

6. A process according to claim 5 wherein the mixed liquor recycled from said second aeration zone or said third aeration zone to said first aeration zone is about 100 to about 400% of the volume of the wastewater introduced into said first aeration zone.

7. A process according to claim 2 including the steps of introducing the waste water influent and recycled activated sludge into a preliminary mixing zone having a volume substantially smaller than the volume and located upstream of said first aeration zone and mixing the wastewater and recycled activated sludge in said preliminary mixing zone by introducing a pressurized oxygen-containing gas into the lower portion of said preliminary mixing zone in an amount and under conditions which provide sufficient agitation to effect substantially homogeneous mixing of the wastewater influent and recycled activated sludge and minimize settling of solids from the resulting mixed liquor; and transferring the mixed liquor from said preliminary mixing zone to said first aeration zone.

8. A process according to claim 1 wherein said oxygen-containing gas is air.

9. A process according to claim 1 including the step of recycling a portion of the mixed liquor from said subsequent aeration zone to said first aeration zone for mixing therein with the wastewater and the recycled activated sludge.

10. A process according to claim 9 wherein the mixed liquor recycled from said subsequent aeration zone to said first aeration zone is about 100 to about 400% of the volume of the wastewater introduced into said first aeration zone.

11. A process according to claim 1 wherein the sludge recycled to said first aeration zone is about 50 to about 100% of the volume of the wastewater introduced into said first aeration zone.

12. A process according to claim 1 including the steps of introducing the wastewater influent and recycled activated sludge into a preliminary mixing zone having a volume substantially smaller than the volume and located upstream of said first aeration zone and mixing the wastewater and recycled activated sludge in said preliminary mixing zone by introducing a pressurized oxygen-containing gas into the lower portion of said preliminary mixing zone in an amount and under conditions which provide sufficient agitation to effect substantially homogeneous mixing of the wastewater influent and recycled activated sludge and minimize settling of solids from the resulting mixed liquor; and transferring the mixed liquor from said preliminary mixing zone to said first aeration zone.

13. A process according to claim 1 wherein said oxygen-containing gas is introduced into the lower portion of said subsequent aeration zone by a plurality of bubble diffusers having a flexible member made from an expandable, elastomeric material and including perforations having openings for producing bubbles which have a diameter of about 1 to about 4 mm, when said oxygen-containing gas is introduced under pressure into said diffusers.

14. A process according to claim 3 wherein said fine bubble aerating devices comprise a plurality of fine bubble diffusers having a flexible member made from an expandable, elastomeric material and including perforations having openings for producing bubbles which have a diameter of about 1 to about 4 mm, when said oxygen-containing gas is introduced under pressure into said diffusers.

* * * * *

UNITED STATES PATENT AND TRADEMARK OFFICE
CERTIFICATE OF CORRECTION

PATENT NO. : 4,961,854

DATED : October 9, 1990

INVENTOR(S) : John W. Wottmann, et al.

It is certified that error appears in the above-identified patent and that said Letters Patent is hereby corrected as shown below:

Column 7, line 22, the word "or" should read --liquor--.

Signed and Sealed this

Fourteenth Day of January, 1992

Attest:

HARRY F. MANBECK, JR.

*Attesting Officer*      *Commissioner of Patents and Trademarks*

UNITED STATES PATENT AND TRADEMARK OFFICE
CERTIFICATE OF CORRECTION

PATENT NO : 4,961,854

DATED : October 9, 1990

INVENTOR(S): John W. Wittmann et al.

It is certified that error appears in the above-identified patent and that said Letters Patent is hereby corrected as shown below:

Column 1, line 39, "orbal" should be "Orbal"

Signed and Sealed this

Sixth Day of June, 2000

Attest:

Q. TODD DICKINSON

*Attesting Officer*  *Director of Patents and Trademarks*